US012499322B2

(12) United States Patent
Laban et al.

(10) Patent No.: US 12,499,322 B2
(45) Date of Patent: Dec. 16, 2025

(54) SYSTEMS AND METHODS FOR A READING AND COMPREHENSION ASSISTANCE TOOL

(71) Applicant: Salesforce, Inc., San Francisco, CA (US)

(72) Inventors: Philippe Laban, New York, NY (US); Chien-Sheng Wu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 421 days.

(21) Appl. No.: 18/159,616

(22) Filed: Jan. 25, 2023

(65) Prior Publication Data

US 2024/0095464 A1    Mar. 21, 2024

Related U.S. Application Data

(60) Provisional application No. 63/407,346, filed on Sep. 16, 2022.

(51) Int. Cl.
*G06F 40/40* (2020.01)

(52) U.S. Cl.
CPC .................................. *G06F 40/40* (2020.01)

(58) Field of Classification Search
CPC ....................................................... G06F 40/40
See application file for complete search history.

(56) References Cited

U.S. PATENT DOCUMENTS

| 11,288,296 | B2* | 3/2022 | Al Hasan | G16H 15/00 |
| 2007/0118548 | A1* | 5/2007 | Carapella | G06F 16/2428 |
| 2014/0258832 | A1* | 9/2014 | Hepp | G06F 40/143 |
| | | | | 715/234 |
| 2019/0354848 | A1* | 11/2019 | Kotri | G06F 8/38 |
| 2022/0391595 | A1* | 12/2022 | Shevelev | G06F 40/56 |
| 2023/0222164 | A1* | 7/2023 | Silverstein | G06F 16/3329 |
| | | | | 707/723 |
| 2024/0021325 | A1* | 1/2024 | Cunningham | G06N 5/04 |

* cited by examiner

*Primary Examiner* — Kevin Ky
(74) *Attorney, Agent, or Firm* — Haynes and Boone, LLP

(57) ABSTRACT

Embodiments described herein provide system of a neural network based news reading tool. The system includes a communication interface receiving one or more text passages from data sources. The system also includes a memory storing a discord question neural model that generates a discord question according to the text passages. The system further includes processors executing processor-executable instructions to perform operations that include determining, by the discord question neural model, respective locations within the one or more text passages for inserting the discord question; receiving, via the communication interface from a client component, an indication that a user device is accessing a first text passage from a first data source; and sending, via the communication interface, the discord question, and a first location corresponding to the first text passage to the user device thereby causing the client component to generate and display a reading interface widget.

20 Claims, 12 Drawing Sheets

Inflation vs recession

Inflation Hits New 40-Year High of 8.5%: Why Prices Keep Climbing

Published by ~~~~~~

From your purchases at the grocery store to the dollar tag of rent across the US, consumer prices are soaring across the country. Your dollar doesn't have the purchasing power it used to, and that's a problem.

Inflation climbed by 8.5% through March, according to the Consumer Price Index. The CPI is a key indicator of inflation, defined as the sustained rise in the cost of living. The increase marks inflation's fastest annual rise since December 1981. Core inflation, which measures all items minus food and gas, rose 6.5%. This kind of sustained and increased inflation may point to something more enduring.

What does this mean for you? Here are some key things you need to know about inflation, how it can impact your budget and how it impacts your spending power.

MORE CONTEXT

▼ Who does inflation affect?

American people ~~~~~~~~    Americans ~~~~~~~~ both consumers and businesses ~~~~~~~~

Powell ~~~~~~~~ housing market ~~~~~~~~ medical device company market ~~~~~~~~ investors ~~~~~~~~

Typically, we see a 2% inflation rate from year to year. It's when the rate rises above this percentage in a short period of time when inflation becomes a concern.

MORE CONTEXT

▶ How does inflation become a concern? ~~~~~~~~

FIG. 5

Inflation vs recession

---

*Story Summary:*
To combat the highest inflation rate during the height of "stagflation" in 1981, the Federal Reserve on Wednesday announced yet another increase to the central bank's overnight interest rate, hiking it 75 basis points. Overall, the Fed has gradually increased interest rates from near 0 to between 2.25 and 2.50 percent in just four months, the fastest tightening of monetary policy since the Fed's attempt to battle stagflation in the early 1980s.

---

Q. How does inflation affect the economy?

- With the economy facing headwinds thanks in part to soaring inflation, both consumers and businesses will see an erosion of their finances and ability to plan for the future.

- Simply put, inflation is a sustained increase in consumer prices. It means a dollar bill doesn't get you as much as it did before, whether you're at the grocery store or a used car lot.

*Show more answer groups.*

Q. What does the Federal Reserve do?

- To combat the highest inflation rate during the height of "stagflation" in 1981, the Federal Reserve on Wednesday announced yet another increase to the central bank's overnight interest rate, hiking it 75 basis points. Overall, the Fed has gradually increased interest rates from near 0 to between 2.25 and 2.50 percent in just four months, the fastest tightening of monetary policy since the Fed's attempt to battle stagflation in the early 1980s.

- The Federal Reserve also plays a significant role in slowing down inflation. It should continue to raise the Federal Funds Rate and pay interest on reserves while simultaneously reducing the assets on its balance sheet. The Fed will need to pursue a more neutral plan focused mainly on curbing inflation. Unfortunately, the Fed has placed itself in a challenging position to do these things. It procrastinated tightening for too long.

*Show more answer groups.*

FIG. 6A

```
def select_discard_qs(questions):
    # Initialize output and progress word count
    selected_qs, seen_paragraphs = [], set()
    while True:
        # Score each discard question
        for q in questions:
            # A question's score is the number of unseen answering paragraphs
            q.score = len(q.paragraph_set - seen_paragraphs)
        # Select the highest scoring question
        selected_q, score = questions.select_best_q()
        if score == 0:
            # Exit if no question introduces unseen paragraphs
            break
        # Add question to final list
        selected_qs.append(selected_q)
        # Mark question's paragraphs as seen
        seen_paragraphs = seen_paragraphs | selected_q.paragraph_set
    return selected_qs
```

FIG. 6B

SYSTEMS AND METHODS FOR A READING AND COMPREHENSION ASSISTANCE TOOL

CROSS REFERENCE(S)

The instant application is a nonprovisional of and claim priority under 35 U.S.C. 119 to U.S. provisional application No. 63/407,346, filed Sep. 16, 2022. This application is related to co-pending and commonly-owned U.S. nonprovisional application Ser. No. 17/971,241. The aforementioned applications are hereby expressly incorporated by reference herein in their entirety.

TECHNICAL FIELD

The embodiments relate generally to natural language processing and machine learning systems, and more specifically to systems and methods for a reading and comprehension assistance tool.

BACKGROUND

Readers often access the news through multiple channels, such as social media, mobile news applications, printed press, and/or the like. In this multi-channel setting, it becomes important for readers to have easy ways to compare and contrast opinions of varying sources, as a lack of transparency risks readers exposure to bias on critical societal issues.

Therefore, there is a need for an improved news reading interface providing news articles with higher diversity and better comparison in coverage differences.

BRIEF DESCRIPTION OF THE DRAWINGS

FIG. 5 illustrates an exemplary Annotated Article interface, according to some embodiments described herein.

FIG. 6A illustrates an exemplary Recomposed Article interface, according to some embodiments described herein.

FIG. 6B illustrates a piece of exemplary Python code used in the generation of the Recomposed Article interface, according to some embodiments described herein.

Figure 1:
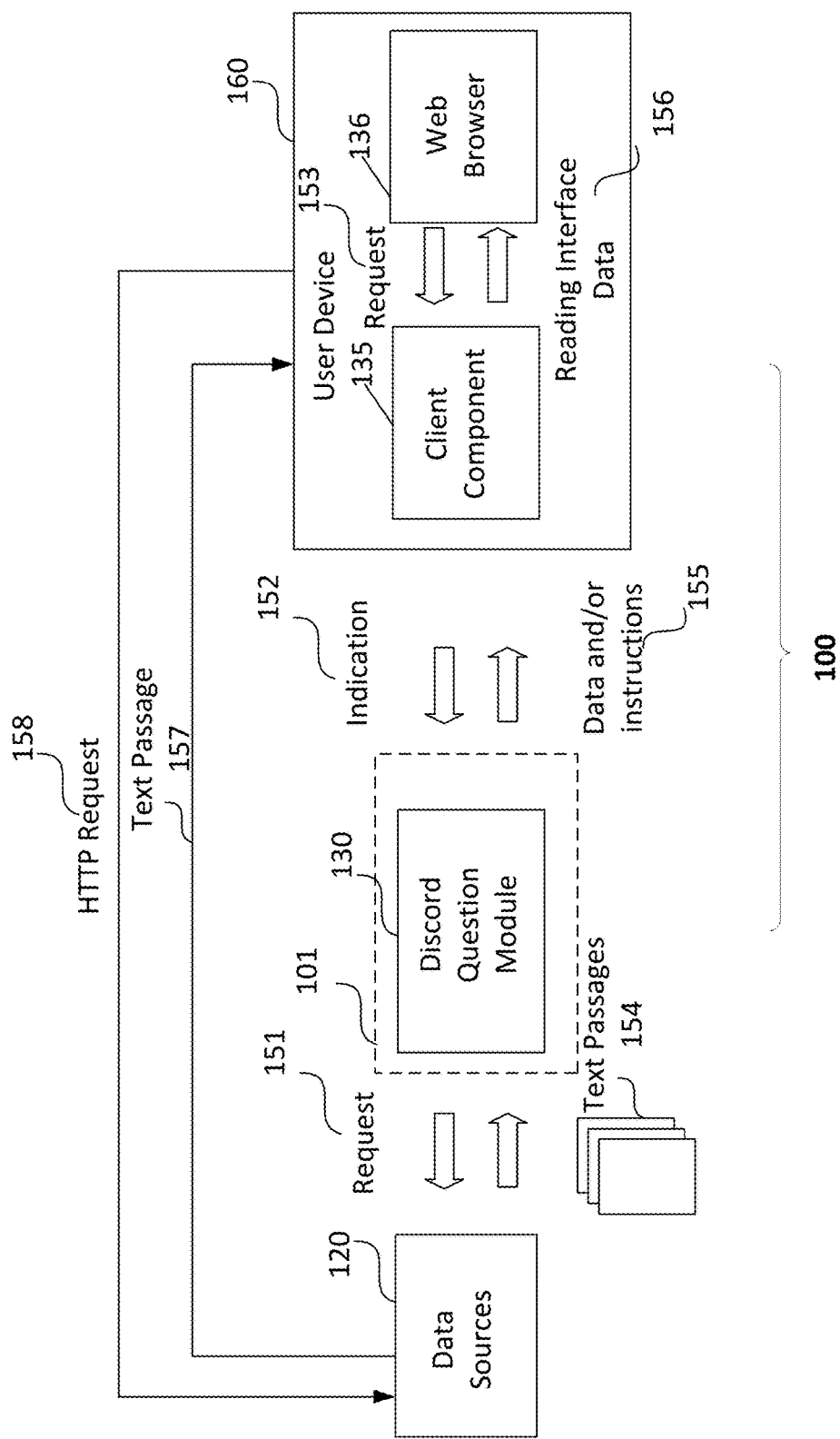
FIG. 1 illustrates a simplified diagram of a discord question framework for generating a reading interface widget, according to some embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

News coverage often contain bias linked to the source of the content. As many readers rely on a few sources of news, these readers can be exposed to bias. Existing news aggregators can offer news readers diverse source alternatives for a given topic. However, the users of these news aggregators must invest an undesirably large amount of time and effort to read and sift through the news of various sources to understand a story's coverage diversity.

Existing methods to present coverage diversity include offering meta-data about the sources, article clustering, and topic-modeling-based approaches. However, source-based information can be overly generic. Article clustering and topic-modeling-based approaches can be complex for some users. For example, existing methods often do not help readers to compare details in coverage differences with news articles, and the burden of aligning articles to compare source differences on story-specific issues is left to the readers.

In view of the need for a news aggregator that can improve news diversity in multi-source settings and users' reading experience, embodiments described herein provide systems and methods for generating reading interface widgets using a reading and comprehension assistance tool. A reading interface widget, showing on a user device, displays discord questions and answers based on a story/topic covered by a variety of data sources, allowing the users to compare different data sources. Specifically, the reading and comprehension assistance tool communicates amongst a user device, a discord question server, and a plurality of data source servers, and generates a reading interface widget that displays diverse perspectives from different data sources on a story. When a user attempts to access a news article, covering the story, from a user device, the reading and comprehension assistance tool may generate data and/or instructions for assembling the reading interface widget, and command the user device to generate the reading interface widget. The user can then easily view and compare the diverse perspectives from different data sources on the story from the user device.

In some embodiments, the discord question server may be integrated at a third-party server not affiliated with any news providers. The discord question server may aggregate news stories from various data source servers and generate discord questions. Details of employing a neural network based generation model to generate discord questions may be found in U.S. nonprovisional application Ser. No. 17/971, 241. In some embodiments, the data source servers may be the servers of data vendors such as cnet.com, nytimes.com, etc.

The discord question server may be stored with a discord question framework, implemented on one or more neural networks. The discord question framework is trained to generate one or more discord questions based on a story covered by a plurality of news article from the plurality of data sources, and one or more semantic groups of answers to the discord question. The answers in the same group may be semantically similar, and the answers in different groups may be semantically different. The answers are each provided by a respective news article covering the story and from one of the data sources. The discord question framework may also determine the layout of a reading interface widget displayed on the user device, e.g., locations of the discord questions and the answers in a news article. In some embodiments, the discord questions, the answers, and the location data for a news article may be generated prior to the user's attempt to access the news article, and may be stored on the discord question server.

In an example, when a user attempts to a news article (e.g., provided by one of the data source servers) covering a story from the user device, the client component may detect the user's action and send a request to the discord question server. The discord question server, in response to the request, sends a discord question associated with the story to the user device via the client component. The discord question server may also send one or more semantic groups answers to the discord question, and locations of the discord question and the answers to the user device. In some embodiments, the discord question server also sends links (e.g., html links) to the data sources that provide the answers and other data such as a summary of the story, paragraphs containing the answers from other news articles, etc. The client component may dictate the user device to generate a reading interface widget that displays the news article, the discord question, the answers, and the links associated with the answers. In some embodiments, the client component is communicatively coupled to the discord question server and the user device. The client component may include at least one or more of an application programming interface (API), a cookie, and a web browser extension installed on the user device.

Embodiments described herein provide a number of benefits. For example, the reading interface widget provides an easier way for the reader to compare different perspectives from different news sources (e.g., data sources/vendors). The user can access different perspectives for the same story without having to spend too much time and effort browsing along different data sources. Also, because the training, computing, generating of discord questions and answers, and determining the layout of the reading interface widget are performed by the discord question server, the computing required by the user device is minimized. The user experience for accessing a story from a news provider is improved. Further, the discord questions, the answers, and the location data for a news article may be generated prior to the user's attempt to access the news article, the delay caused by the data transmission and the generation of the reading interface widget is minimized. In some embodiments, the user can turn on/off the function of the reading and comprehension assistance tool, or install/uninstall the client component according to the user's preference, further improving the user experience for accessing a story from a news provider.

Overview

FIG. 1 is a simplified diagram illustrating a discord question framework 100, according to some embodiments. Discord question framework 100 comprises a discord question module 130 and a client component 135, communicatively coupled to each other. Discord question server 101 may be communicatively coupled to data sources 120 (e.g., servers of one or more data vendors). Client component 135 may be installed on a user device 160 and may communicate with the discord question module 130 at discord question server 101 via a communication network. In some embodiments, client component 135 is communicatively coupled to a web browser 136 of user device 160.

As shown in FIG. 1, the communication between web browser 136 and client component 135, client component 135 and discord question module 130, and discord question module 130 and data sources 120 may each be bidirectional. Discord question module 130 may be implemented on a server (e.g., a news provider server such as CNN.com or a third-party server not affiliated with any news providers), and client component 135 may be one or more of a client-side API, a cookie, or a web browser extension installed on user device 160.

Data sources 120 may include servers of data vendors providing new data and/or user data (e.g., cnet.com, nytimes.com, etc.). User device 160 may include any suitable device that has a web browser, a display screen, a processor, and a memory, such as a mobile phone, as further discussed in relation to 310 in FIG. 0.3. Client component 135 may facilitate the bidirectional communication between user device 160 and the server that implements discord question module 130. For example, client component may receive/detect a request 153 from web browser 136 that a user attempts to access a text passage (a web-based text passage such as a news article) on one of data sources 120, and user device 160 may send a HTTP request 158 to access the text passage one the respective data source via client component 135. The discord question server 100 may receive an indication 152 of such access attempt via the client component 135. The discord question server 100 and client component 135 may together generate a reading interface widget on user device 160. Example reading interface widgets are shown in FIGS. 4, 5, 6A and 7.

Specifically, discord question module 130 may access a plurality of text passages 154 (e.g., news articles) on the servers of data sources 120. In response to receiving the indication 152 that the user device 160 is attempting to access a news article relating to a certain topic, discord question module 130 may determine the certain topic of the news article, e.g., by extracting keywords from the title, metadata, and/or the like, and then sends a request 151 to each of data sources 120 to request for text passages 154 relating to the same topic. Upon receiving requests 151, data sources 120 may send links to text passages 154 to discord question module 130. Discord question module 130 may generate one or more discord questions based on text passages 154, and one or more semantic groups of answers to the discord questions.

For example, a discord question refers to a question to which (i) the answers can be provided by at least most (e.g., equal to or greater than 30% of) text passages 154 (or data sources 120) and (ii) exhibit diversity (e.g., the largest semantic group of answers to the question includes no more than 70% of all answers). For a discord question, answers in the same semantic group are semantically similar, e.g., conveying similar opinion/content. For a discord question, answers in different semantic groups are semantically different, e.g., conveying different opinions/content. In an embodiment, semantic similarity may be determined based on a threshold similarity score. For example, a similarity score between any two of the answers in the same semantic group may be higher than or equal to the threshold similarity score, and a similarity score between any two of the answers in different semantic groups may be lower than the threshold similarity score. The semantic groups of answers may reflect different perspectives on the discord question, from various data sources 120 (or text passages 154). Additional details of generating discord questions and semantic groups of answers based on different news articles can be found in co-pending U.S. nonprovisional application Ser. No. 17/971,241, filed Oct. 26, 2022.

Discord question module 130 may also determine the layout of a reading interface widget that presents the discord question and the answers. For example, the discord questions may be presented in an annotated article format, a recomposed article format, or a question grid format. In the annotated article format, a discord question, related answers, and links to the data sources providing the answers, are embedded in the text passage. For example, they may be presented immediately below the paragraph that answers the discord question. In the recomposed article format, the text passage is not shown. Instead, a summary of the story covered by the text passage is presented at the top of the reading interface widget, and one or more discord questions are presented below the summary. Each of the discord questions is followed by the respective answers and links. In the question grid format, the text passage is not shown. Instead, one or more discord questions and links to the data sources providing the related answers are presented as a grid. The discord questions and the links are also ranked to reflect popularity of the discord questions. Details of the three formats are described in FIGS. 4, 5, 6A and 7.

In an embodiment, discord question module 130 may determine the location within a particular news article to insert a specific discord question and the answers with respect to the particular news article (e.g., in the annotated article format). In another embodiment, discord question module 130 may determine the locations to arrange the discord question and the answers when the particular news article is not shown (e.g., in the recomposed article format and the question grid format). Such location information may be stored in discord question server 101. Discord question server 101 may also stores the links from discord question server 101 to each of data sources 120.

In one embodiment, discord question module 130 may send request 151 to the data sources 120 for news articles (text passages 154) periodically, intermittently or constantly, with or without the demand from receiving the indication 152 that a user is attempting to access a news article. In this way, discord questions may be generated either in real-time in response to a user's access attempt, or asynchronously— for example, discord questions may be prepared for trendy news articles so that they can be distributed to user devices in preparation of heightened reader interests.

A user may attempt to access text passage 157 from web browser 136 of user device 160, and a request 153 for accessing text passage 157 may be detected by client component 135. Client component 135 may send an indication 152 to discord question module 130 regarding the user's attempt. In some embodiments, user device 160 may send HTTP request 158 to a corresponding data server of text passage 157 via client component 135. In response to receiving indication 152, discord question module 130 may send data and/or instructions 155, e.g., discord questions related to text passage 157, semantic groups of answers, locations of the discord questions and the answers, links to the respective data sources of the answers, rendering/layout parameters, and any metadata and/or instructions for constructing a reading interface widget, to client component 135. Upon receiving data and/or instructions 155, client component 135 may generate reading interface data 156 using data and/or instructions 155 for user's viewing in web browser 136.

In some embodiments, reading interface data 156 includes any data for rendering the discord questions, answers, format parameters, layout templates, and links in a format (e.g., the annotated article format, the recomposed article format, and/or the question grid format) presented by web browser 136. User device 160 may then present the reading interface widget within the web browser 136 by assembling the discord questions, the semantic groups of answers and links of each answer to the respective data source according to the rendering instructions contained in instructions 155. The user may then browse the requested text passage with the discord questions and the answers via the reading interface widget on user device 160.

Computer and Network Environment

Figure 2:
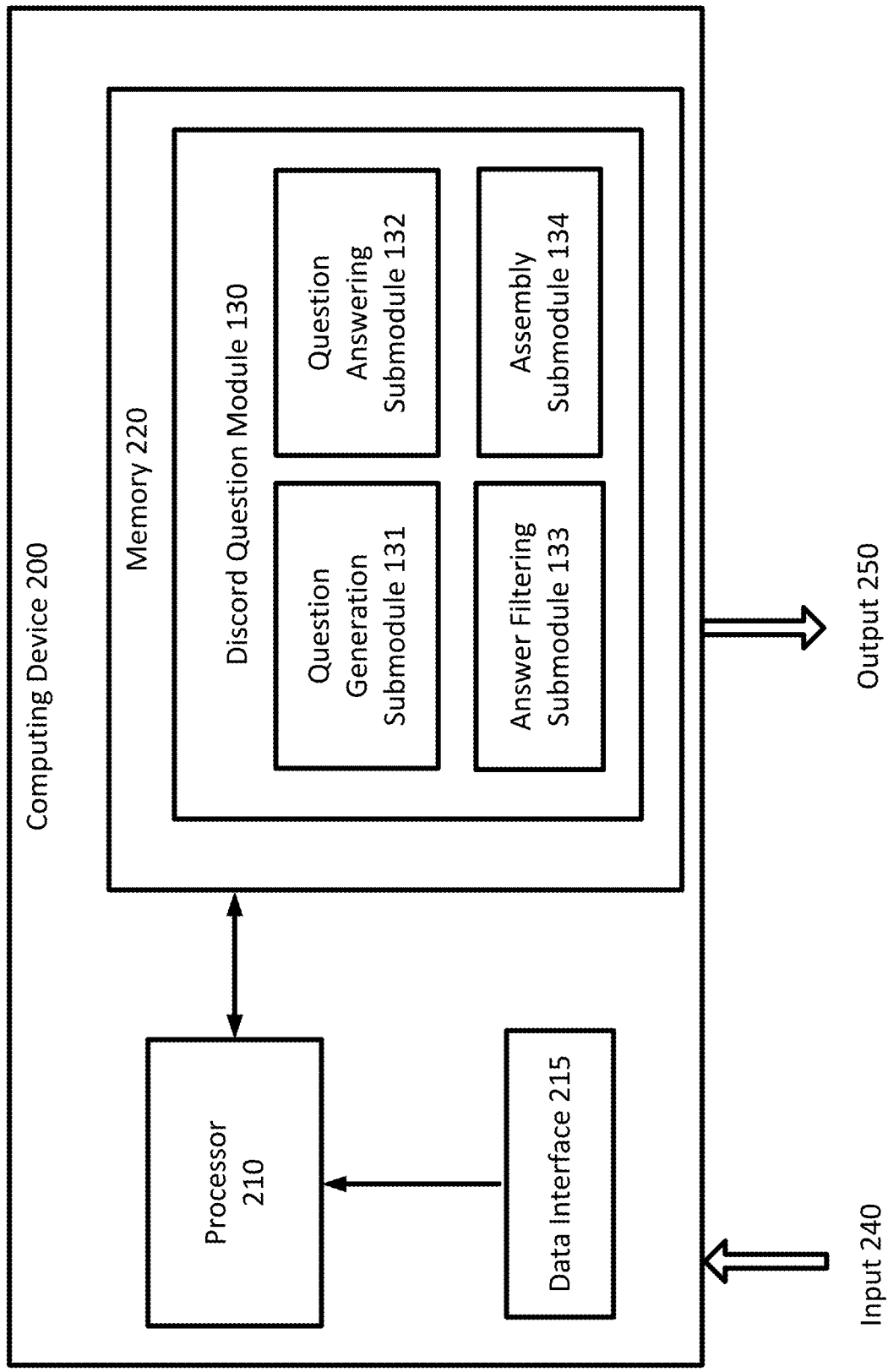
FIG. 2 is a simplified diagram illustrating a computing device implementing the discord question generation and reading interface assembly according to some embodiments.

FIG. 2 is a simplified diagram illustrating a computing device implementing discord question module 130 described in FIGS. 1, 3-5, 6A, 6B, 7, 8A, 8B, 9, and 10, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for discord question module 130 that may be used to implement and/or emulate the systems and models, and/or to implement any of the methods described further herein. Discord question module 130 may receive input 240 such as an input training data (e.g., text passages or news articles) via the data interface 215 and generate an output 250 which may be discord questions and semantic groups of answers for training. Examples of input 240 may also include text passages 154 from data sources 120. Examples of output 250 may include data and/or 155 (e.g., discord questions, semantic groups of answers, locations of the discord questions and the answers, and links to the data sources of the answers from computing device 200, and any related metadata).

The data interface 215 may comprise a communication interface, and/or a user interface (such as a voice input interface, a graphical user interface, and/or the like). For example, the computing device 200 may receive the input 240 (such as a training dataset) from a networked database via a communication interface. Or the computing device 200 may receive the input 240, such as indication 152, from a user via the user interface.

In some embodiments, discord question module 130 is configured to generate data and/or instructions 155. Discord question module 130 may include a question generation submodule 131, a question answering submodule 132, an answer filtering (or consolidation) submodule 133, and an assembly submodule 134. Specifically, question generation submodule 131 is configured to train a question generation model, and to generate a plurality of candidate questions using the trained question generation model. Question answering submodule 132 is configured train a question answering model, and to generate a plurality of answers to each of the candidate questions using the trained question answering model. Answer filtering submodule 133 is configured to train an answer filtering model, and group the answers to the candidate questions into semantic groups. Answer filtering submodule 133 is also trained to determine the discord questions from the candidate question based on the semantic groups. The trained question generation submodule 131, question answering submodule 132, and answer filtering submodule 133 can together generate discord questions and semantic groups of answers to the discord questions at the input of a plurality of text passages (e.g., news articles) that cover the same story. Assembly submodule 134 is configured to generate/collect data (e.g., data and/or instructions 155) for assembling a reading interface widget that presents the data such as the discord questions, the semantic groups of answers related to each discord question, the locations of the discord questions and the answers, and the source linked to each answer. Assembly submodule 134 may transmit the data to user device 310 (e.g., similar to or the same as user device 160) via network interface 333 in operation. Detailed description of the generation of data and/or instructions 155 is illustrated below in FIG. 8B.

In one embodiment, discord question module 130 and its submodules 131-134 may be implemented by hardware, software and/or a combination thereof.

In one embodiment, discord question module 130 and one or more of its submodules 131-134 may be implemented via an artificial neural network. For example, submodules 131-133 may each be implemented on a neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 220 as a structure of layers of neurons, and parameters describing the non-linear transformation at each neuron and the weights associated with edges connecting the neurons. An example neural network may be a bidirectional auto-regressive transformer (BART)-based model described by Mike Lewis et al. (BART: Denoising Sequence-to-Sequence Pre-training for Natural Language Generation, Translation, and Comprehension. In *Proceedings of the 58th Annual Meeting of the Association for Computational Linguistics*. 7871-7880, 2020), a RoBERTa model described by Yinhan Liu et al., (Roberta: A robustly optimized bert pretraining approach. arXiv preprint arXiv: 1907.11692, 2019), and/or the like.

In one embodiment, the neural network based discord question module 130 and one or more of its submodules 131-134 may be trained by updating the underlying parameters of the neural network based on the loss described in relation to FIG. 8A (described in below). For example, a cross-entropy loss is calculated as differences between the predicted token (e.g., word token) distribution and the ground-truth, and thus is a metric that evaluates how far away a neural network model generates a predicted output value from its target output value (also referred to as the "ground-truth" value). Given the computed cross-entropy loss, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to its target output value.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
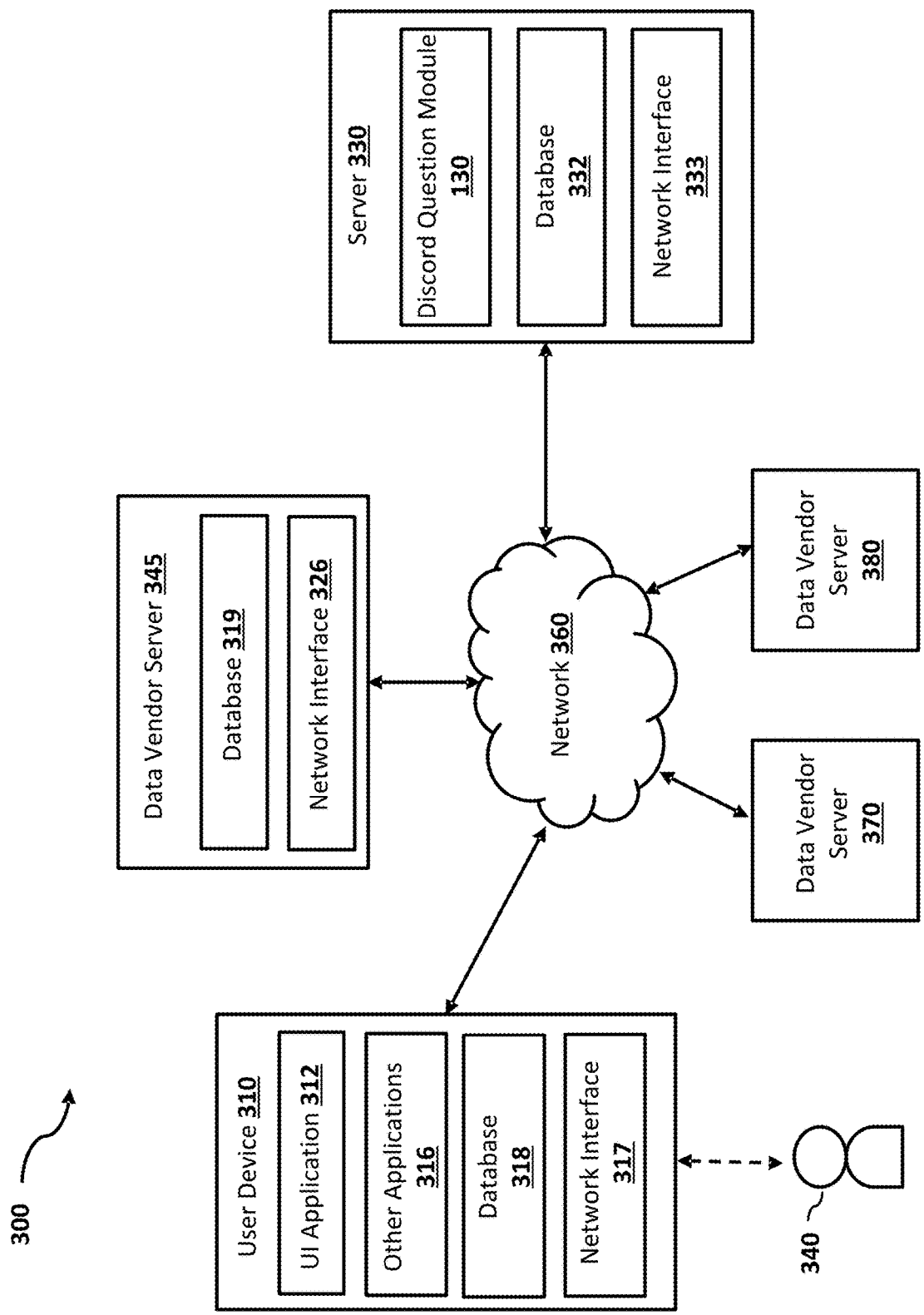
FIG. 3 is a simplified block diagram of a networked system suitable for implementing the discord question framework described in FIGS. 1, 4, 5, 6A, 6B, 7, 8A, 8B, 9, and 10 and other embodiments described herein.

FIG. 3 is a simplified block diagram of a networked system suitable for implementing the discord question framework described in FIGS. 1, 2, 4, 5, 6A, 6B, 7, 8A, 8B, 9, and 10 and other embodiments described herein. In one embodiment, block diagram 300 shows a system including the user device 310 which may be operated by user 340, data vendor servers 345, 370 and 380, server 330 (e.g., similar to discord question server 101 in FIG. 1), and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310 (e.g., similar to user device 160 in FIG. 1), data vendor servers 345, 370 and 380 (e.g., similar to data sources 120 in FIG. 1), and the server 330 (e.g., similar to discord question server 101 in FIG. 1) may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 (similar to user device 160 in FIG. 1) may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message (or data) indicating data and/or instructions (e.g., 155) from the server 330 and display the message (or data) via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 440 to view a reading interface widget that displays a text passage, discord questions, and semantic groups of answers to the discord questions. For example, other applications 316 may include the client component (e.g., similar to 135 in FIG. 1) such as a client-side API, a cookie, and/or a web browser extension installed on user device 310.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 (e.g., similar to or the same as one of data sources 120) may correspond to a server that hosts database 319 to provide training datasets including a plurality of text passages (e.g., a plurality of news articles) to the server 330. The database 319 may be implemented by one or more relational database, distributed databases, cloud databases, and/or the like. For example, data vendor server 345 may be a server of a data source, which can include any media platform including any TV media (e.g., CNN, Fox News, NBC, etc.), print or digital media (e.g., New York Times, Guardian, Mail Online, etc.), social media (e.g., TikTok, Twitter, Facebook, Instagram, etc.), blogging service (e.g., Medium, arXiv, etc.), and/or any other alternative media, that often host the article on its distribution platform. In some embodiments, data vendor server 245 is stored with one or more text passages, e.g., news articles. A news article may include a headline, the article's content, and optionally a summary. In some embodiments, data vendor servers 370 and 380 may each be similar to data vendor server 345, and may each be a data source that provides one or more text passages (e.g., news articles).

Data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the discord question module 130 and its submodules described in FIG. 2. In some implementations, discord question module 130 may receive data from database 319 at the data vendor server 345 via the network 360 to generate discord questions, semantic groups of answers, and layout information of the discord question and the answers in a text passage. In some embodiments, the generated discord questions and semantic groups of answers may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store metadata of the discord question module 130. In one implementation, the database 332 may store previously generated discord questions, semantic groups of answers, layouts of discord questions and answers in a text passage, training data, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

In some embodiments, user device 310 includes a mobile device installed with a web browser or similar application (e.g., a UI application 312). User 340 can access text passages (e.g., news articles) from a data vendor server (e.g., 345, 370, and/or 380) from the web browser or the similar application. Server 330 may be implemented with a discord question module 130 and communicatively connected to data vendor servers (e.g., 345, 370, and/or 380) and user device 310. Other Applications 316 may include a client component which can be a client-side API, a cookie, and/or a web browser extension installed on user device 310. The client component can facilitate transmission of bidirectional data and/or signal between user device 310 and server 330. User device 310 may access a data vendor server (345, 370, and/or 380) via the client component.

In some embodiments, server 330 trains discord question module 130 to generate discord questions, semantic groups of answers to the respective discord questions, and location information of the discord questions and answers in a text passage. The training and inference processes are to be described in FIGS. 8A and 8B. Discord question module 130, after training, can generate discord questions, semantic groups of answers to the respective discord questions, and location information of the discord questions and answers in reading interface widget in advance to or at the time user 340 attempts to access a text passage from a data vendor server (e.g., 345, 370, or 380). In an example, discord question module 130 may generate discord questions, answers, and links of all text passages provided by various data vendor servers (e.g., 345, 370, and 380), and may generate the location information of the text passage user 340 attempts to access after receiving the indication from the client component. In another example, discord question module 130 may generate discord questions, answers, location information, and links of all text passages provided by various data vendor servers (e.g., 345, 370, and 380) prior to receiving the indication from the client component. In some embodiments, a user inputs the discord questions at user device 310, and the client component transmits the discord questions to discord question module 130 to generate semantic groups of answers, links, and location information for constructing one or more reading interface widgets, e.g., the Annotated Article interface, the Recomposed Article interface, and/or the Question Grid interface. For example, a user may input discord questions into user device 310 and obtains a Question Grid interface for viewing.

In some embodiments, when user 340 attempts to access a text passage (e.g., referring back to 157) in data vendor server 345, e.g., from a browser in user device 310, the client component sends an indication (e.g., referring back to 152) to server 330 via network interface 317 indicating that user 340 is accessing the text passage provided by data vendor server 345. Data vendor server 345 may send the text passage, requested by user 340 to user device 310 via the client component. In the meantime, server 330, receiving the indication via network interface 333, may send data (e.g., data and/or instructions 155), e.g., one or more discord questions generated based on the story of the text passage, semantic groups of answers of respective discord question, location information (e.g., layout information) for the discord questions and answers in the reading interface widget (e.g., in the text passage), and links to the data sources providing the answers to the client component via network interface 333. In various embodiments, the data can be generated prior to receiving the indication and stored in database 332, or generated after receiving the indication from the client component. The client component may further generate the data and optionally instructions (e.g., reading interface data 156) for rendering the text passage, the discord questions, answers, and links in a format for the web browser (e.g., referring back to 136) of user device 310. The web browser may present a reading interface widget having the text passage, the discord questions, the answers, and the links on user device 310. In some embodiments, the processor(s) of user device 310 executes the instructions and assembles the reading interface widget.

In some embodiments, the data and metadata for the reading interface widget (e.g., data and/or instructions 155) may vary based on the different types of reading interface widgets to be generated by user device 310. For example, the type/format of reading interface widget to be generated on user device 310 may be pre-determined. When an Annotated Article interface is to be generated on user device 310, the data and metadata may include one or more discord questions generated based on the text passage (e.g., news article or 157) the user attempts to access, semantic groups of answers to each of the discord questions, and links to the data source of each answer. When a Recomposed Article interface is to be generated on user device 310, the data and metadata may include a summary of the contents of a plurality of text passages (e.g., news articles) from various data sources (including the text passage the user attempts to access), one or more discord questions generated based on the plurality of text passages, semantic groups of answers to each of the discord questions, and links to the data source of each answer. In some embodiments, the data and metadata also includes paragraphs that contains the answers, and ranking information of the discord questions. When a Question Grid interface is to be generated on user device 310, the data and metadata may include one or more discord questions generated based on the text passage the user attempts to access, semantic groups of answers to each of the discord questions, and links to the data source of each answer. In some embodiments, the data and metadata also includes paragraphs that contains the answers, and respective ranking information of the discord questions and the answers. User device 310 may display one of the Annotated Article interface, the Recomposed Article interface, and the Question Grid, based on a configuration/setting on user device 310.

In some embodiments, the data and metadata includes all the data necessary for generating all of the Annotated Article interface, the Recomposed Article interface, and the Question Grid, such that the user can generate any of the three interfaces, or switch between any two interfaces on user device 310. For example, the data and metadata may include one or more discord questions generated based on the text passage (e.g., news article) the user attempts to access, a summary of the contents of a plurality of text passages (e.g., news articles) from various data sources (including the text passage the user attempts to access), one or more discord questions generated based on the plurality of text passages, semantic groups of answers to each of the discord questions, paragraphs containing the answers, ranking information of the discord questions and the answers, and links to the data source of each answer.

Figure 4:
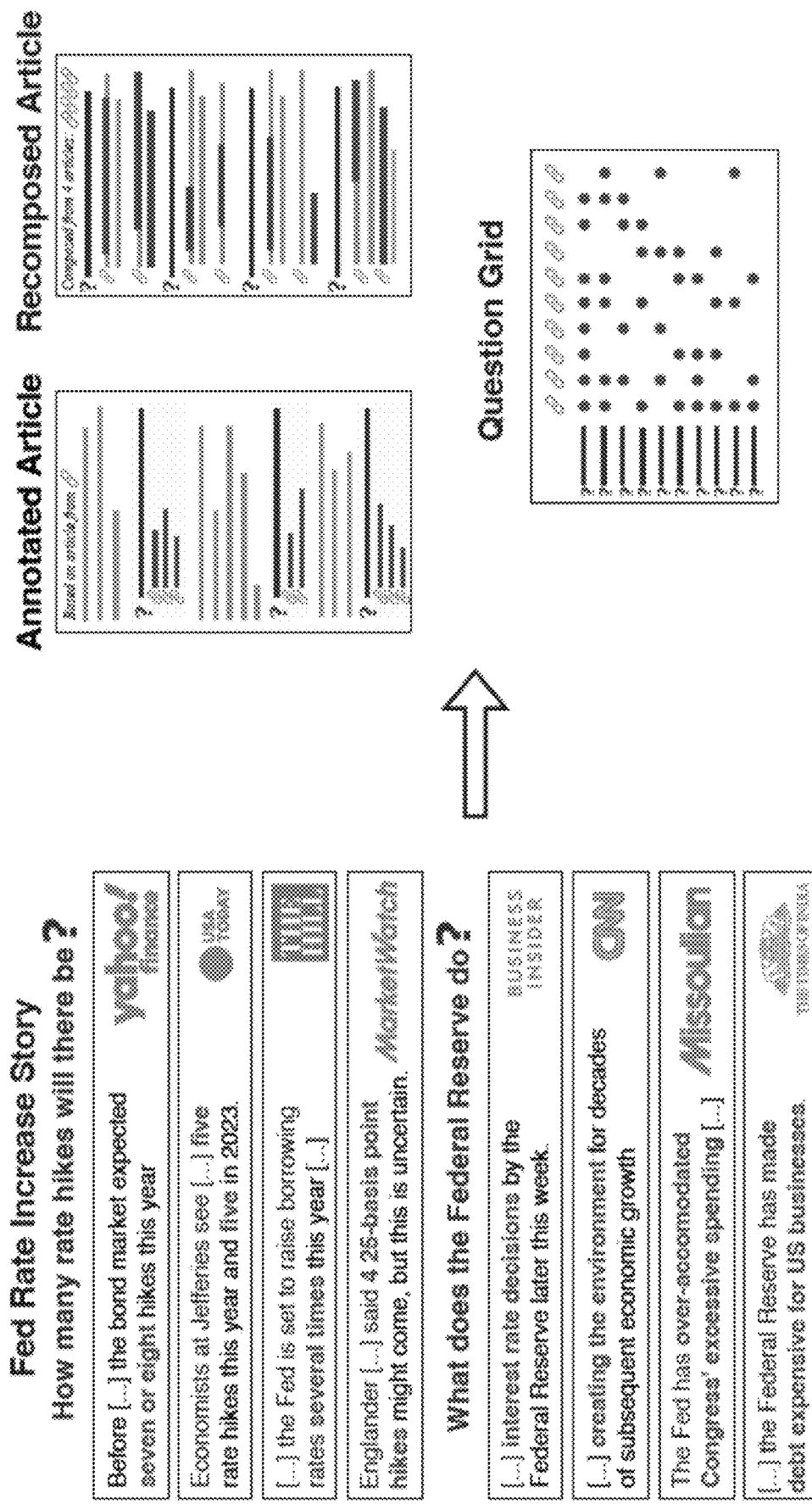
FIG. 4 provides exemplary reading interface widgets of different embodiments described herein.

FIG. 4 illustrates example stories, discord questions, and reading interface widgets assembled by incorporating the discord questions, according to some embodiments. For example, an example story may be a "Federal Rate Increase Story" covered by a number of data sources (e.g., news articles provided by the data vendor servers of the data sources), such as "Yahoo Finance," "USA TODAY," "THE HILL," "MarketWatch," "BUSINESS INSIDER," "CNN," "Missoulian," and "THE TIMES OF INDIA." The discord questions generated based on the story may include a first question of "How many rate hikes will there be?" and a second question of "What does the Federal Reserve do?" For ease of illustration, only one semantic group of answers to each discord question is shown in FIG. 4. For example, the answers in the semantic group to the first question may be provided by data sources of "Yahoo Finance," "USA TODAY," "THE HILL," and "MarketWatch," and the answers in the semantic group to the second question may be provided by data sources of "BUSINESS INSIDER," "CNN," "Missoulian," and "THE TIMES OF INDIA." Three different reading interface widgets, i.e., Annotated Article interface, Recomposed Article interface, and Question Grid interface, are shown to present the discord questions and the answers.

FIG. 5 illustrates an exemplary Annotated Article interface, according to some embodiments. An Annotated Article interface is generated by assembling a text passage (e.g., a "basis" news article) with discord questions and respective answers inserted between paragraphs. In some embodiments, a discord question is inserted immediately below the paragraph where the answer to the discord question is provided. The respective semantic groups of answers may be displayed immediately below the discord question. A link to the data source where an answer is provided may be displayed after the answer (e.g., in the same line as the answer). In an embodiment, answers of the same semantic group may be displayed in the same line. A discord question and its respective answers and links may together be referred to as an annotation. In some embodiments, an annotation can be shown as an expanded view (e.g., showing the discord question, all the answers, and respective links) or a collapsed view (e.g., showing only the discord question). As shown in FIG. 5, a two discord question-based annotations are inserted into a cnet news article, with the first annotation in expanded view and the second annotation in collapsed view. The title of the article "Inflation Hits New 40-Year High of 8.5%: Why Prices Keep Climbing" is displayed at the top of the reading interface widget (e.g., above the paragraphs of the news article). To the discord question "Who does inflation affect," answers "American people" and "Americans" may be two answers that are semantically similar (e.g., in the same semantic group), and "both consumers and businesses" may be an answer in another semantic group. When a user (e.g., 340) is reading the news article on cnet.com, the user may also access the original news articles that provide the answers by clicking on the links displayed after the answers. In some embodiments, the Annotated Article interface displays an option for user 340 to switch to the Recomposed Article interface or the Question Grid interface.

FIG. 6A illustrates an exemplary Recomposed Article interface, according to some embodiments. The Recomposed Article interface is generated by assembling a story covered by multiple text passages (e.g., news articles from multiple different data sources) including the text passage user 340 attempts to access, and a sequence of discord questions generated form the multiple text passages. The summary may be extracted from one of the data sources (e.g., news articles from the data sources), e.g., to provide basic facts and context of the story covered by the text passage user 340 attempts to access. A plurality of discord questions may be displayed below the summary. Each of the discord questions is followed by a list of paragraphs containing the answers to the story from the data sources. In some embodiments, the discord questions may be presented as a sequence ranked by the amount of unseen content it introduces, with the discord question addressed by the most data sources being the first discord question, and the discord question addressed by the fewest data sources being the last discord question. In some embodiments, a greedy algorithm is performed to sort the discord questions. FIG. 6B illustrates Python code for a composition algorithm used for sequence selection in the Recomposed Article interface. A plurality of (e.g., a fixed number of) paragraphs containing the answers to the respective question may be displayed below the respective discord question, and a link to the data source may be displayed immediately after the paragraph. In various embodiments, the displayed paragraphs may be in the same semantic group or in different semantic groups. In some embodiments, one or more paragraphs (or semantic groups of answers) are in a collapsed view and not shown. In some embodiments, the Recomposed Article interface displays an option for user 340 to switch to the or the Annotated Article interface or the Question Grid interface. For example, as shown in FIG. 6A, the Recomposed Article provides an option to switch to the Question Grid interface, i.e., "Open Grid View," on the upper left corner.

As shown in FIG. 6A, a plurality of data sources (e.g., "cnet.com" "theweek.com," "marketwatch.com," "mishtalk.com," "kamanews.com," and 41 other sources), displayed on the top of the reading interface widget, may be used to generate a summary (e.g., "Story Summary") that is displayed below the data sources. Two discord questions, "How does inflation affect the economy" and "What does the Federal Reserve do," may be displayed below the summary. Each of the discord question may be followed by two paragraphs, each providing an answer from a respective data source, e.g., "azbigmedia.com," "cnet.com," "lobservateur.com," and "missoulian.com." In some embodiments, the answer span in the paragraph is bolded. When user 340 accesses a news article from a data source, e.g., cnet.com, user 340 may view the Recomposed Article interface on user device 310. User 340 can click on the link to "cnet.com" to continue reading the original news article, and/or can click on the link after "Show more answer groups" to browse more paragraphs to a discord question.

Figure 7:
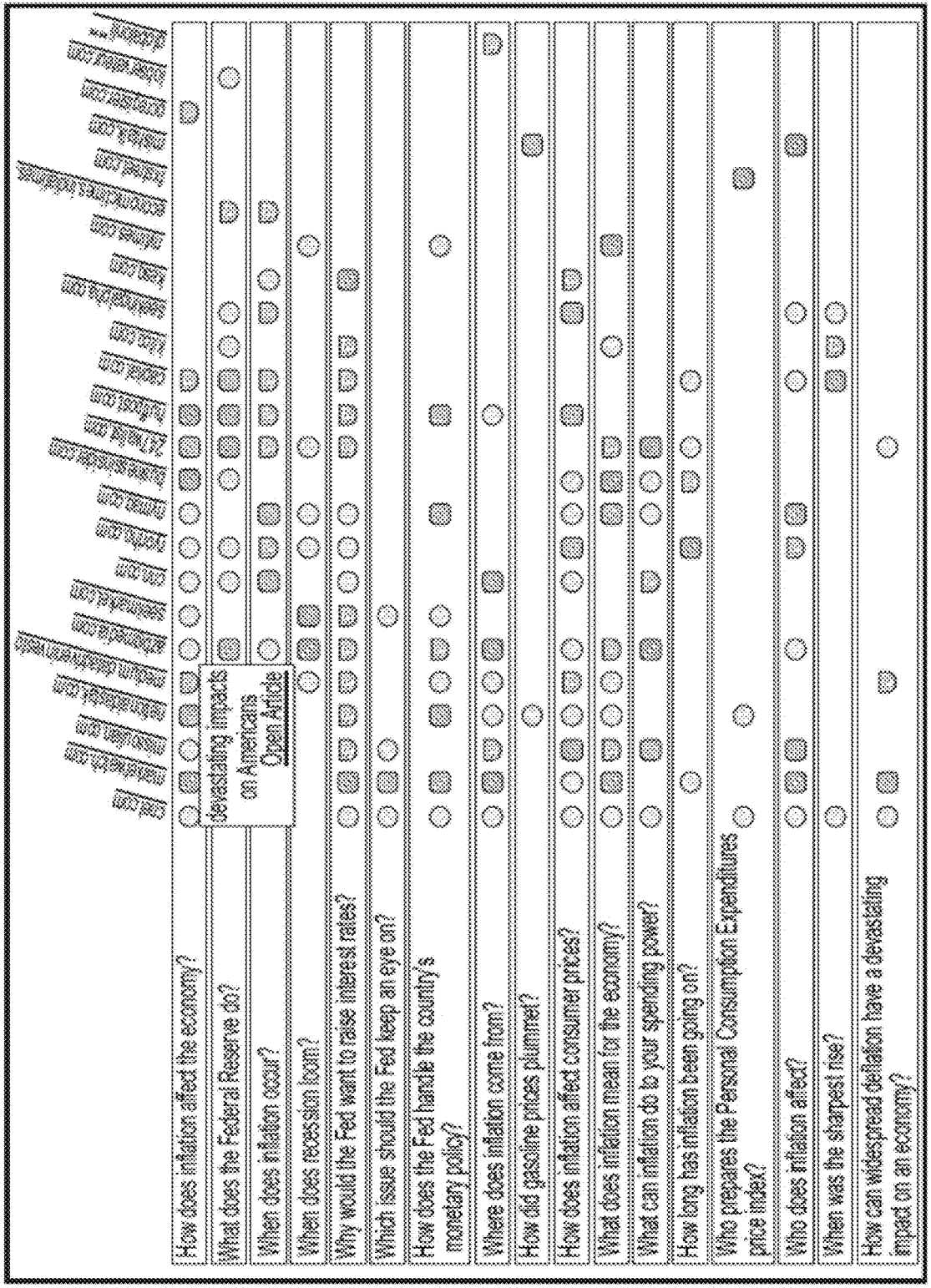
FIG. 7 illustrates an exemplary Question Grid interface, according to some embodiments described herein.

FIG. 7 illustrates an exemplary Question Grid interface, according to some embodiments. The Question Grid interface is generated by assembling the discord questions based on the text passage, which a user (e.g., 340 in FIG. 3) attempts to access, and data sources providing answers to the discord questions. The answers in the same semantic group have the same symbol (e.g., same shade and same shape). The Question Grid interface presents a two-dimension grid. Each row of the grid represents a discord question, and each column represents a data source. An intersection of a row i and a column j is represented by an item (i, j), which is empty if the respective data source j does not answer the discord question or is marked with a symbol if the respective data source j answers the discord question. In some embodiments, the discord questions and the answers may each be ranked for display. The answers in the same semantic group are displayed as the same symbol. For example, the discord questions may be ranked by the number of data sources that answers each discord question, e.g., the discord question answered by the largest number of data sources may be displayed at the top of the grid, and the discord question answered by the smallest number of data sources may be displayed at the bottom of the grid. The data sources may be ranked by the number of discord questions answered by a data source, e.g., the data source that answers the largest number of discord questions may be displayed at the left side (e.g., closest to the discord questions) of the grid, and the data source that answers the smallest number of discord questions may be displayed at the right side (e.g., farthest to the discord questions). In some embodiments, the discord questions and the answers may be sorted/ranked using a greedy algorithm. In some embodiments, the Question Grid interface displays an option for a user to switch to the Recomposed Article interface or the Annotated Article interface.

When a user accesses a text passage from data vendor server (e.g., 345 in FIG. 3), the user may view the Question Grid interface. A hover window may appear when user 340 moves the mouse over the symbol at (i, j), as show in FIG. 7. The hover window may contain the answer span of the data source j for discord question i. The user can click on the hover window to open the data source j's news article in a new browser tab.

One or more models may be employed to generate the discord questions and answers in inference. Submodules 131-133 of discord question module 130 may each train a respective model for its functions. The models may be trained separately or jointly. In some embodiments, the models of each of submodules 131-133 is implemented on neural networks in server 330, and are trained separately. For example, question generation submodule 131 may train a question generation model, question answering submodule 132 may train a question answering model, and answer filtering submodule 133 may train an answer filtering model. FIG. 8A shows an example block diagram in which a model 804 is trained to generate an output 806 at an input 802, according to embodiments of the present disclosure. Model 804 may be an example of a question generation model, a question answering model, or an answer filtering (or consolidation) model. Model 804 may be trained to generate output 306 used for the generation of the discord questions (or the input of the next model). In some embodiments, the training data of model 804 includes input 802 and ground-truth 808. Ground-truth 808 may be manually-created.

Figure 8A:
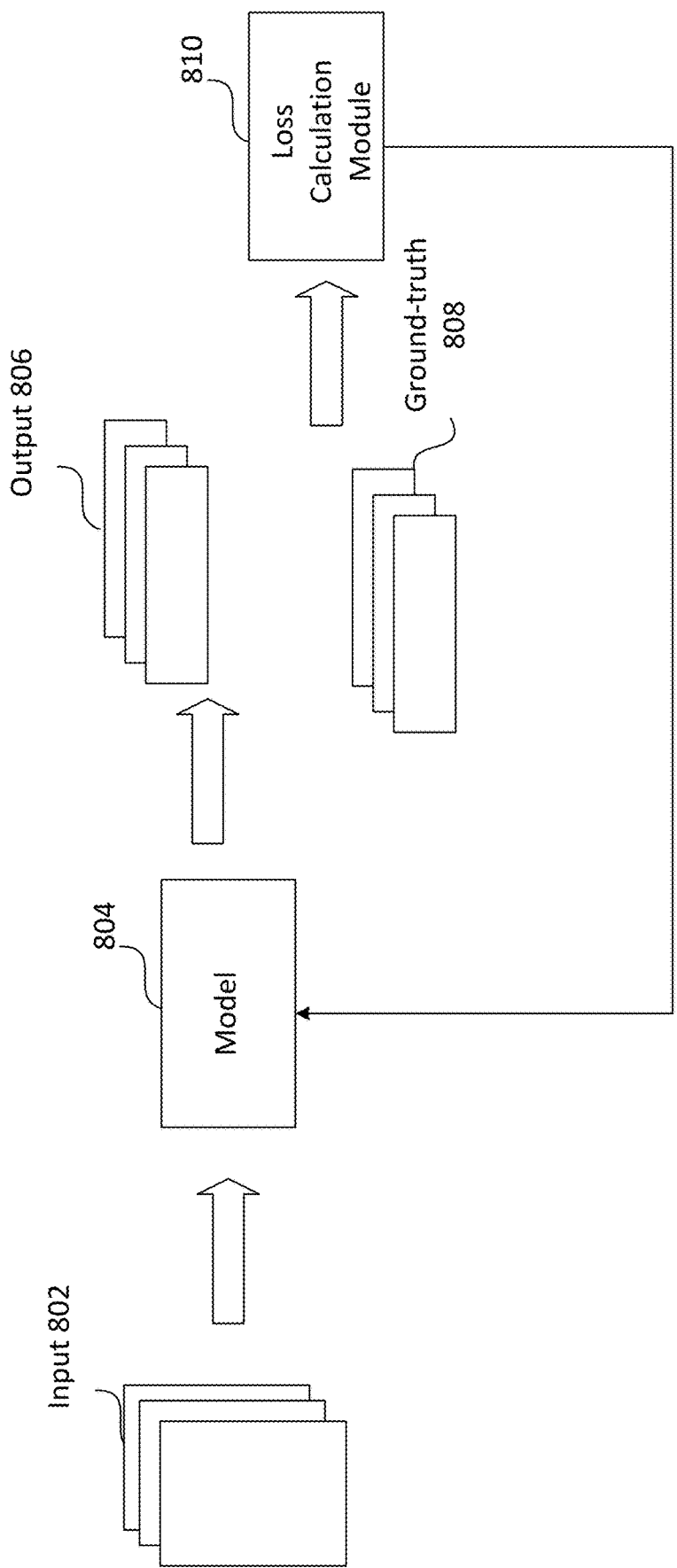
FIG. 8A illustrates a training process of a submodule in the discord question framework, according to some embodiments described herein.

As shown in FIG. 8A, for the training of model 804, model 804 may receive the training data (e.g., input 802 and ground-truth 808). Input 802 may be fed to model 804. Model 804 may generate output 806. For example, output 806 may include a predicted distribution of tokens. Such predicted distribution may then be compared with ground-truth 808 that are associated with training input 802 by a loss calculation module 810. Loss calculation module 810 may calculate a cross-entropy loss based on the difference between the predicted token (e.g., word token) distribution of output 806 and the ground-truth 808. The computed cross-entropy loss is then used to update to model 804 by backpropagation. In this way, the probability of P(Ground-truth 808|Input 802) is maximized through the training of model 804. In some embodiments, model 804 may be trained to predict output 806 that are sufficiently similar to ground-truth 808.

In some embodiments, the question generation model is trained to generate a plurality of candidate questions from a plurality of text passages. For example, input 802 of the question generation model 804 may include a plurality of text passages (e.g., news articles from various data vendor servers such as 345, 370, and/or 380) that describe the same story, and ground-truth 408 may be manually-created questions associated with the story. In some embodiments, the question answering model is trained to generate answers to the candidate questions. In some embodiments, input 802 of the question answering model includes one or more text passages, and one or more questions. The text passages may cover a same story. Ground-truth 808 may be manually-created answers to the questions. In some embodiments, the answer filtering model is trained to generate one or more semantic groups of answers to each candidate question, and select one or more discord questions from a plurality of candidate questions based on the semantic groups of answers. In some embodiments, input 802 of the answer filtering model includes one or more answers and one or more questions. Ground-truth 808 may be manually-grouped answers to the questions.

Figure 8B:
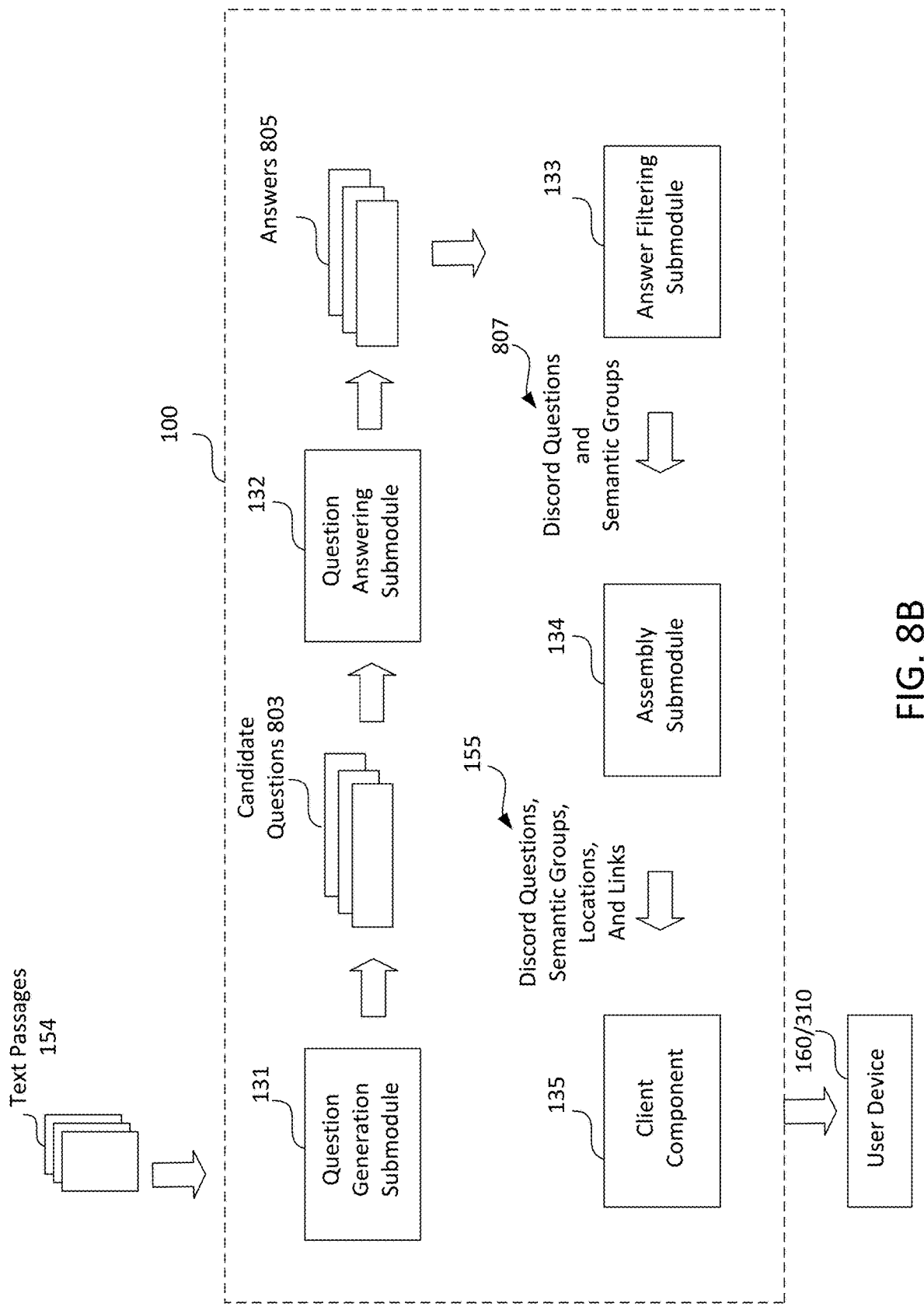
FIG. 8B illustrates a detailed diagram of a discord question framework for generating a reading interface widget, according to some embodiments described herein

FIG. 8B shows a box diagram illustrating the components in an exemplary discord question framework 100, according to embodiments of the present disclosure. As shown in FIG. 8B, discord question framework 100 may include a question generation submodule 131, a question answering submodule 132, an answer filtering submodule 133, an assembly submodule 134, and a client component 135. At inference, question generation submodule 131 may generate a plurality of candidate questions 803 in response to receiving text passages 154 as input. Question answering submodule 132 may generate answers 805 to each candidate questions 803 in response to receiving candidate questions 803 as input. Answer filtering submodule 132 may generate one or more discord questions and one or more semantic groups of answers to each discord question as output 807. Assembly submodule 134 may generate location data for arranging the discord questions and answers in a reading interface widget. Assembly submodule 134 may then collect data for generating one or more reading interface widgets that presents the discord questions, the semantic groups related to each one of discord questions, the location data, and the source linked to each answer to send to client component 135.

Question generation submodule 131 may receive text passages 154 (e.g., news articles from various data sources/vendor servers) and generate one or more candidate questions 803 using any content of text passages 154 (or data sources) via a question generation model (e.g., a trained question generation model). In some embodiments, a plurality of candidate questions 803 are generated. In some embodiments, the question generation model is a T5-Discord model trained on a combination of subsets of NewsQA, FairyTaleQA and InquisitiveQG. Upon receiving each of candidate questions 803, question answering submodule 132 may extract content from each of text passages 154 via a question answering model (e.g., a trained question answering model), as an answer 805 to each of the candidate questions 803. The question answering model has been trained to extract, e.g., select spans of text, in the contents of text passages 154 that most directly answer the question without modification. When a text passage doesn't contain any answer to a candidate question, the question answering model does not generate answer from the text passage and may generate "No Answer" for the text passage. In an embodiment, each candidate question 803 may be answered by one or more of text passages 154, and may thus have one or more answers each linked to a different data source. In some embodiments, the question answering model is a RoBERTa-Large model trained on common extractive question answering datasets.

Answer filtering submodule 133 may receive all of answers 805 and organize answers 805 of each candidate questions into semantic groups using an answer filtering model (e.g., a trained answer filtering model). For each candidate question, answers in the same semantic group are semantically similar, e.g., conveying similar opinion/content. For each candidate questions, answers in different semantic groups are semantically different, e.g., conveying different opinions/content. In an embodiment, semantic similarity may be determined based on a threshold similarity score. For example, a similarity score between any two of the answers in the same semantic group may be higher than or equal to the threshold similarity score, and a similarity score between any two of the answers in different semantic groups may be lower than the threshold similarity score.

Based on the semantic groups of answers related to respective candidate questions, the answer filtering model may also be trained to determine a portion of candidate questions 803 that are qualified as discord questions. In some embodiments, the answer consolidation model is trained to determine that a candidate question is qualified as a discord question when the answers to a candidate question is both available and exhibit diversity. In an embodiment, a candidate question is determined to be available when the answers to the candidate question is provided in greater than or equal to a first pre-defined percentage of text passages 154. In an embodiment, a candidate question is determined to be discord question when the largest semantic group related to the candidate question contains less than or equal to a second pre-defined percentage of all the answers to candidate questions 803. Covered by lower than the first pre-defined percentage of text passages 154, a candidate question may be considered not sufficiently available (e.g., a peripheral question). If the largest semantic group related to a candidate question contains more than the second pre-defined percentage of all the answers, the candidate question may not have sufficiently diverse answers (e.g., a consensus question). In an example, a candidate question is qualified as a discord question when the answers to the candidate question is provided by at least 30% of text passages 154 (or data sources) and the largest semantic group contains no more than 70% of all the answers to the candidate question.

Assembly submodule 134 may generate location data that presents the discord questions, the semantic groups of answers, and the data sources linked to each answer in a reading interface widget (e.g., in a text passage). Assembly submodule 134 may also send data and/or instructions 155, e.g., the location data for at least one of the reading interface widgets, the discord questions, the semantic groups of answers, the data sources, and other related data such as a summary of a story, to client component 135. Client component 135 may then send data and/or instructions 155 (e.g., metadata) and for assembling a reading interface widget, to user device 160/310. In various embodiments, discord question framework 100 may generate data and/or instructions 155 prior to or upon receiving an indication (e.g., 152) from client component 135. For example, data and/or instructions 155 may be stored in server 330 (e.g., in a memory or database 332). In an embodiment, the question generation model, the question answering model, and the answer filtering model are separately trained prior to the process of generating discord questions shown in FIG. 8B.

Example Work Flows

Figure 9:
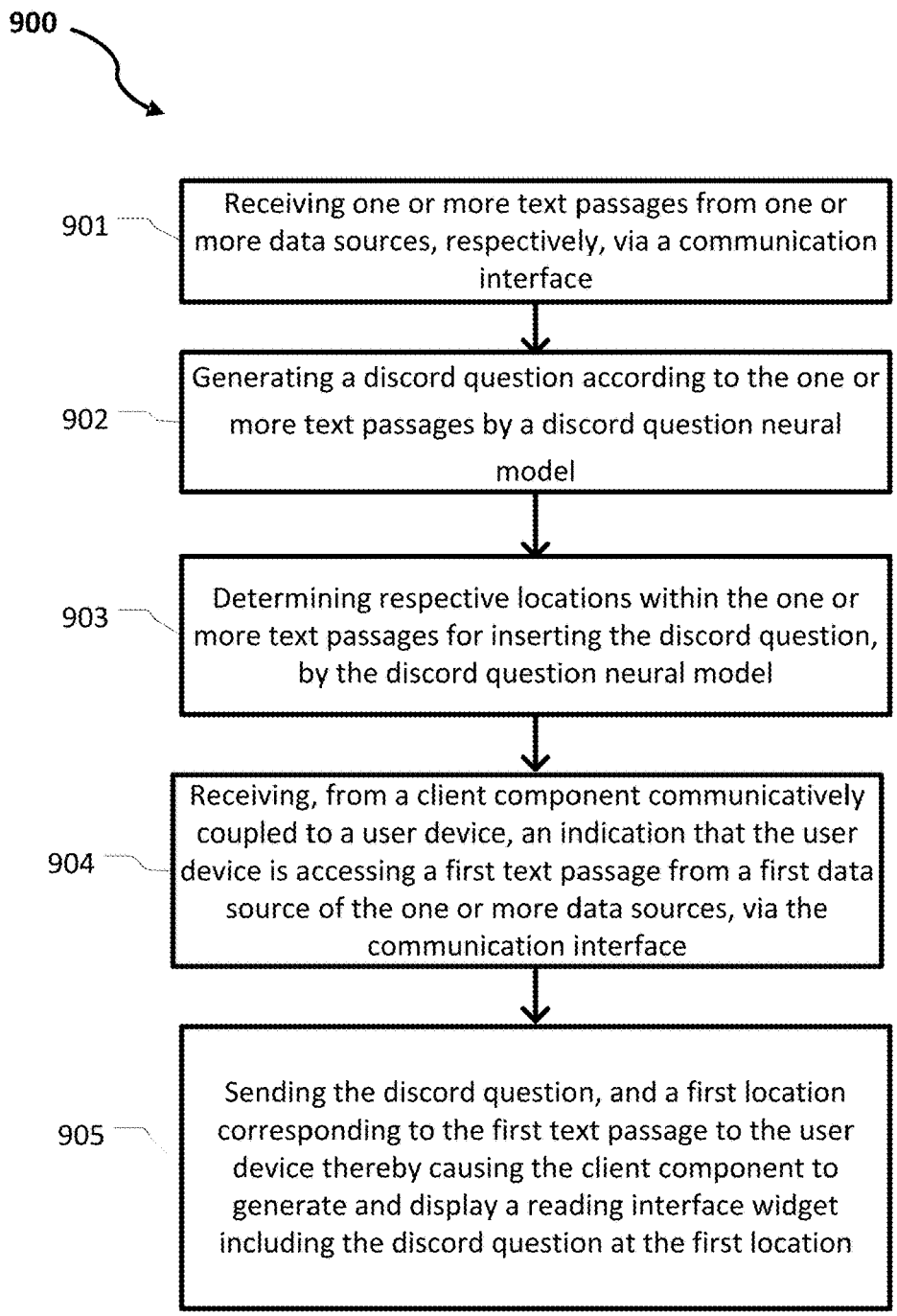
FIG. 9 illustrates a flowchart of an exemplary process to generate a reading interface widget, according to some embodiments described herein.

FIG. 9 is an example logic flow diagram illustrating a method 900 of generating a reading interface widget based on the framework shown in FIGS. 1 and 8B, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the operation of the discord question module 130 (e.g., FIGS. 1-3, and 8A and 8B) that performs reading interface widget assembly by incorporating discord questions and answers into a text passage.

As illustrated, the method 900 includes a number of enumerated steps, but aspects of the method 900 may include additional steps before, after, and in between the enumerated steps. In some aspects, one or more of the enumerated steps may be omitted or performed in a different order.

At step 901, one or more text passages (e.g., 154) are received from one or more data sources (e.g., 120, 345, 370, and 380), respectively via a communication interface (e.g., 333).

At step 902, a discord question (e.g., 155) according to one or more text passages is generated by a discord question neural model (e.g., 130, 804). In some embodiments, the discord question neural model is stored and operated at a server (e.g., 330), and the one or more data sources include one or more servers of news outlets (e.g., FIGS. 5, 6A, and 7). In some embodiments, for a particular text passage, the discord question neural model may generate a prediction of text span in the passage as an answer to the discord question. A location of the text span within the passage may then be stored as an indication of the location where the discord question may be displayed on a user interface with the text passage. In some embodiments, for a particular text passage, the discord question neural model may generate one or more sentences (instead of an existing text span in the text passage) based on the content of the text passage. In such cases, sematic similarity may be used to determine which portion (e.g., paragraph) of the text passage may be most relevant to the generated answer to a discord question. The determine portion within the text passage may be stored as an indication of location where the discord question may be inserted.

At step 903, respective locations (e.g., FIG. 5) within the one or more text passages for inserting the discord question, by the discord question neural model, is determined. In some embodiments, the discord question neural model is trained to generate the discord question and the first answer to the discord question conditioned on the one or more text passages from the one or more data sources (e.g., FIG. 8A). In an embodiment, the discord question neural model is also configured to generate location information (e.g., layout for presenting the discord question, the answers, and the links), rendering parameters, and layout templates of one or more formats (e.g., the annotated article format, the recomposed article format, and/or the question grid format) for inserting the discord questions, answers, and links in one or more reading interface widgets (e.g., the annotated article interface, the recomposed article interface, and/or the question grid interface). For example, the discord question neural model may generate the location information for two or three formats such that a user can switch between two interface widgets. In another example, the discord question neural model may generate the location information for only one format.

In various embodiments, the discord question neural model generates the discord question, semantic groups of answers, and links to the data sources of the answers based on the one or more text passages. To generate the location information for the annotated article format, in an example, the discord question neural model may locate the paragraph that contains the answer to the discord question in one (or each) of the one or more text passages, and generates rendering parameters and layout template for displaying the discord question, the answers, and the links immediately below the paragraph (e.g., above the next paragraph). For example, the discord question may be presented in an annotated article format in the annotated article reading interface (as shown in FIG. 5) within the text passage immediately following or preceding the paragraph that contains the text span and/or relevant content that forms the answer to the discord question.

In one embodiment, for the recomposed article reading interface (as shown in FIG. 6A) and the question grid reading interface (as shown in FIG. 7), the interfaces may be inserted at the determined location within the text passage, e.g., similar to that of inserting discord questions in an annotated reading interface. In other embodiments, the recomposed reading interface and/or the grid reading interfaces may be presented in a floating window overlaying the displayed text passage, on a side panel of the displayed text passage, and/or the like, such that a user may view the text passage and the reading interface in parallel. In some embodiments, to generate the recomposed article format and the question grid format, the discord questions and answers may be placed in predetermined locations in a layout template, e.g., based on the ranking of the discord questions and/or answers, as illustrated in FIGS. 6A and 7.

At step 904, an indication (e.g., 153), from a client component (e.g., 135, 316) communicatively coupled to a user device, that the user device is accessing a first text passage (e.g., FIGS. 5, 6A, and 7) from a first data source (e.g., 345) of the one or more data sources, is received via the communication interface. In some embodiments, the client component includes at least one of an API, a cookie, or a web browser extension installed on the user device and communicatively coupled to the one or more processors.

At step 905, the discord question and a first location corresponding to the first text passage are sent to the user device thereby causing the client component to generate and display a reading interface widget (e.g., FIGS. 5, 6A, and 7) including the discord question at the first location. In some embodiments, the reading interface widget has at least one of an annotated article interface (e.g., FIG. 5) that displays the first text passage and the discord question inserted in the first text passage, a recomposed article interface (FIG. 6A) that displays a summary of the one or more text passages and the discord question after the summary, and a question grid interface (e.g., FIG. 7) that displays the discord question in a row and a respective data source of the first text passage in a column that intersects with the row. For example, if the reading interface widget is an annotated article interface, the first location is within the first text passage. In some embodiments, the first location is immediately after a paragraph containing a first answer to the discord question (e.g., FIG. 5). In some embodiments, an intersection between the row and column is labeled with a symbol that represents a first answer to the discord question and contained in the first text passage (e.g., FIG. 7).

In some embodiments, method 900 further includes determining, by the discord question neural model, a second answer (FIGS. 5, 6A, 7, and 8B) to the discord question based on a second text passage from a second data source of the one or more data sources, the second data source being different from the first data source. In some embodiments, the communication interface further sends the second answer to the discord question the user device thereby causing the client component to display the second answer and a link to the second data source, at the first location within the first text passage and after the discord question (FIGS. 5, 6A, 7, and 8B).

Figure 10:
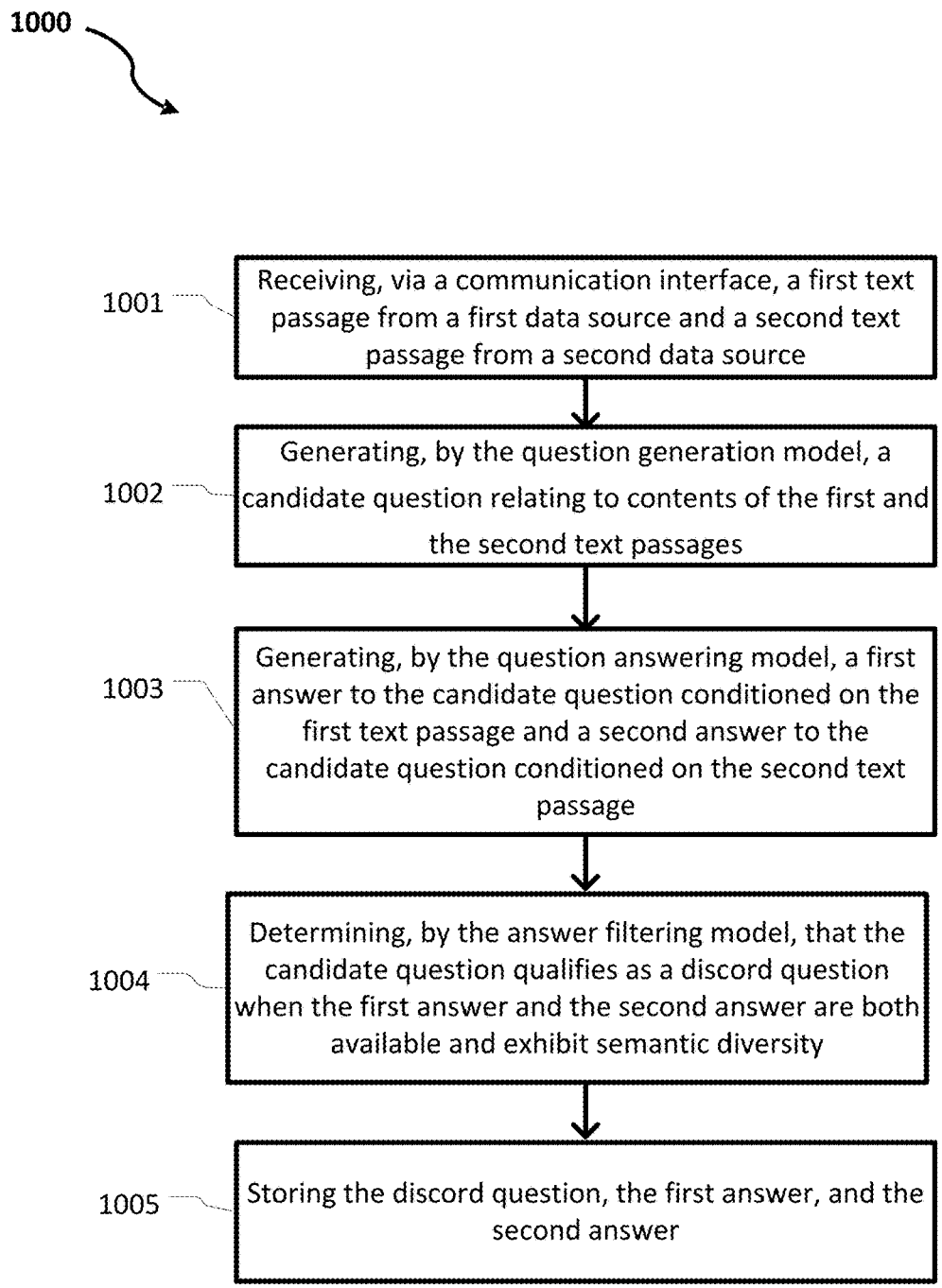
FIG. 10 illustrates a flowchart of an exemplary process to generate a discord question, according to some embodiments described herein.

FIG. 10 is an example logic flow diagram illustrating a method 1000 of generating a discord question based on the framework shown in FIGS. 1 and 8B, according to some embodiments described herein. One or more of the processes of method 100 may be implemented, at least in part, in the form of executable code stored on non-transitory, tangible, machine-readable media that when run by one or more processors may cause the one or more processors to perform one or more of the processes. In some embodiments, method 1000 corresponds to the operation of the discord question module 130 (e.g., FIGS. 1-3, and 8A and 8B) that performs reading interface widget assembly by incorporating discord questions and answers into a text passage.

As illustrated, the method 1000 includes a number of enumerated steps, but aspects of the method 1000 may include additional steps before, after, and in between the enumerated steps. In some aspects, one or more of the enumerated steps may be omitted or performed in a different order.

At step 1001, a first text passage (e.g., 154) from a first data source (e.g., 345) and a second text passage (e.g., 154) from a second data source (e.g., 370/380) are received via a communication interface (e.g., 333).

At step 1002, a candidate question (e.g., 803) relating to contents of the first and the second text passages is generated, by the question generation model (e.g., FIGS. 8A and 8B).

At step 1003, a first answer (e.g., 805) to the candidate question conditioned on the first text passage and a second answer (e.g., 805) to the candidate question conditioned on the second text passage is generated by the question answering model (e.g., FIGS. 8A and 8B).

At step 1004, it is determined by the answer filtering model (e.g., FIGS. 8A and 8B) that the candidate question qualifies as a discord question (e.g., 155) when the first answer and the second answer are both available and exhibit semantic diversity.

At step 1005, optionally, the discord question, the first answer, and the second answer are stored on the respective server (e.g., 332).

Example Results

FIGS. 5, 6A, and 7 represent exemplary test results using embodiments described herein. In the Annotated Article interface, illustrated in FIG. 5, a basis article is selected and its contents are reproduced unaltered. Annotations based on discord questions are inserted between paragraphs of the basis article. By leveraging a high-quality article as a starting point and adding further annotation, the interface may follow a coherent reading order, and introduce discord questions when they become relevant to the story. The annotations act as an add-on to the basis article, each representing optional additional content, which a user can opt into reading.

The headline of the basis article may be at the top of the interface, followed by a by-line detailing the basis article source, and the sequence of paragraphs of the article. If a paragraph contains the answer to a discord question (i.e., it belongs to the answer group of a discord question), an annotation is appended directly after the paragraph. In the example of FIG. 5, the second paragraph mentioned that the readers' budget could be impacted by inflation, and the discord question "Who does inflation affect?" is inserted as an annotation. Annotations are rendered as a collapsible rectangular box, togglable through a user's click. When collapsed only the discord question is visible, and once opened a list of all answers to the question from other sources' becomes visible. Each answer may be inserted on a separate line, with a clickable link to the original source that supplied the answer. All annotations are collapsed initially. In FIG. 5, the first annotation is expanded, and the second collapsed.

For a given news story, the basis article may be automatically selected by counting the number of annotations each news article would have, picking the article with the most annotations. In the extreme, each paragraph of the basis article is associated with a discord question, and the Annotated Article alternates between paragraphs and annotations.

In the Recomposed Article interface, illustrated in FIG. 6A, an article is created de novo using the content of several news sources. First, a summary is extracted from one of the source articles, intended to present the basic facts and context of the news story. The second portion consists of a sequence of discord questions, each composed of the question itself followed by a list of paragraphs containing answers to the question from the story's sources.

The Recomposed Article interface is meant to resemble a standard news article, keeping the overall layout of a textual document meant to be read from top to bottom. The two-step reading process, which first introduces basic facts and necessary minimal context followed by in-depth content, follows the inverted pyramid style common in journalism. The upper portion of the interface introduces the story name, followed by a by-line of all source articles used in the composition.

News articles often include a manually written summary within the page's metadata (Newsroom: A Dataset of 1.3 Million Summaries with Diverse Extractive Strategies. Max Grusky, etc. 2018. In *Proceedings of the* 2018 *Conference of the North American Chapter of the Association for Computational Linguistics: Human Language Technologies*, Volume 1). Summaries are extracted from all sources and select one closest in length to 60 words. In practice, it is found that this simple heuristic yields summaries that give an appropriate introduction to the story.

Each Discord Question may be expected to introduce one dimension of diversity within the story. A greedy algorithm is followed to select the order of appearance of discord questions. The composition algorithm is detailed in FIG. 6B. At a high level, the algorithm iterates over discord questions, selecting questions that introduce the largest amount of unseen content. With this algorithm, questions that are addressed by more sources tend to come earlier in the sequence, and more specific questions discussed by fewer sources appear later. This ordering mirrors the inverted pyramid writing style.

Visually, each selected discord question is represented by a rectangular unit in the interface. The question is followed by two-paragraph answers from distinct sources, in bullet-point format. For each paragraph, the answer span is bolded. In cases where more answers are available, they are added as a horizontal carousel, allowing the user to dig deeper when interested. Source attribution is appended to each paragraph as a blue link, allowing the user to easily access the source of an answer of interest.

In the Question Grid interface, illustrated in FIG. 7, the news story is rendered as a two-dimensional grid. Each row of the grid represents a question and each column a source. Each (i,j)-element in the grid is either empty if source j did not answer question i, or a colored shape when an answer is provided. The color of the shape, detailed further below, signifies answer similarity within a row.

The discord questions data is adapted to the grid format, centered on the questions answered by particular sources. The information-dense visualization is intended for advanced users, to help compare and contrast sources, and inspect the framing choices of newsrooms.

The grid representation relies on choosing an ordering for the questions and the sources. Question ordering—similarly to the Recomposed Article interface—is based on the number of source answers to each question, such that most answered questions are in the upper portion of the grid.

Source order is based on the number of distinct questions answered by each source, with the sources that answer more questions in the left portion of the grid. The combined orders result in the upper-left corner of the grid being the most populated, and other areas of the grid gradually losing answer density. When source j answers question i, a colored shape is inserted in element (i,j) of the matrix. A hover window appears when the user moves the mouse over answer shapes, containing the answer span of the source j for question i. The user can click on the hover window to open the source's article in a new browser tab. Color and shape indicate semantic similarity between answers. The Discord Questions neural model organizes answers to a question into groups, such that all answers within a group relay similar answers to the question. In the grid, each answer group is assigned to a distinct color and shape. For example, the first row of the Question Grid interface in FIG. 7 corresponds to the question: "How does inflation affect the economy?". The seven blue shapes relay that inflation leads to negative effects on consumers, the three red shapes that it leads to an overheating of the economy, and the five grey that it affects the housing market. In order to reduce redundancy in the grid, questions that overlap in their answering groups (i.e., the paragraphs that answer the question) by more than 80% are deduplicated, keeping only the question with the larger number of answers.

In the experiments, Google's source selection process is employed, acquiring the groups of diverse sources covering a common story directly from the live Google News web site. Google News pages for World, Finance, Politics, Business, and Science sections are programmatically visited to extract each news story with at least 10 distinct news sources. For each story, each of the source articles is directly accessed and the newspaper library is used to extract the plain text article. In some cases, an article can only be accessed with a paid account, in which case we only extract basic metadata such as the headline and summary when available.

The Discord Question neural model (the question generation model, the question answering model, and the answer filtering model) processes Google News stories as they are published. On average, the stories contain 37 news articles. The question generation model takes as input individual news articles and generates questions, producing on average around 987 candidate discord questions per story. The question answering model takes as input each candidate's discord question paired with each news article and extracts an answer when one is found. A third and final process confirms or discards each candidate question, based on whether it receives answers from enough sources and whether the answer set is diverse. On average, the discord question neural model produces 16 discord questions. The Discord Question neural model is run on a single server equipped with 4 Nvidia V100 GPUs, one allocated to the question generation model, two to the question answering model, and one to the answer filtering model. With the described resources, we are able to process the incoming stream of stories from Google News, on average processing 403 stories per day.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A system of a neural network based news reading tool, the system comprising:
   a communication interface receiving one or more text passages from one or more data sources, respectively;
   a memory storing a discord question neural model that generates a discord question according to the one or more text passages, and a plurality of processor-executable instructions; and
   one or more processors executing the plurality of processor-executable instructions to perform operations comprising:
   training the discord question neural model based on a training objective of a comparison between a training output for a training input passage and a groundtruth;
   generating, via the trained discord question neural model, a discord question conditioned on the one or more text passages;
   determining, by the trained discord question neural model, respective locations within the one or more text passages for inserting the discord question;
   wherein the communication interface:
      receives from a client component communicatively coupled to a user device, an indication that the user device is accessing a first text passage from a first data source of the one or more data sources, and
      in response to receiving the indication in real time, sends the discord question generated prior to receiving the indication, and a first location corresponding to the first text passage to the user device thereby causing the client component to generate and display a reading interface widget by assembling the discord question with the first text passage at the first location.

2. The system of claim 1, wherein the client component includes at least one of:

an application programming interface (API), a cookie, or a web browser extension installed on the user device and communicatively coupled to the one or more processors.

3. The system of claim 1, wherein the reading interface widget has at least one of:
an annotated article interface that displays the first text passage and the discord question inserted between paragraphs in the first text passage,
a recomposed article interface that displays a summary of the one or more text passages and the discord question after the summary, or
a question grid interface that displays the discord question in a row and a respective data source of the first text passage in a column that intersects with the row.

4. The system of claim 3, wherein the first location is immediately under a paragraph containing a first answer to the discord question.

5. The system of claim 4, wherein the operations further include:
determining, by the trained discord question neural model, a second answer to the discord question based on a second text passage from a second data source of the one or more data sources, the second data source being different from the first data source.

6. The system of claim 5, wherein the communication interface further sends the second answer to the discord question the user device thereby causing the client component to display the second answer and a link to the second data source, at the first location within the first text passage and after the discord question.

7. The system of claim 3, wherein an intersection between the row and column is labeled with a symbol that represents a first answer to the discord question and contained in the first text passage.

8. The system of claim 1, wherein the trained discord question neural model generates the discord question and the first answer to the discord question conditioned on the one or more text passages from the one or more data sources.

9. The system of claim 1, wherein the discord question neural model is stored and operated at a server; and
the one or more data sources include one or more servers of news outlets.

10. The system of claim 1, wherein the communication interface sends the discord question and the first location without sending the first text passage.

11. The system of claim 1, wherein the location includes a second indication of a paragraph or a sentence within the first text passage.

12. A method of reading and comprehension assistance, the method comprising:
receiving, via a communication interface, one or more text passages from one or more data sources, respectively;
training a discord question neural model based on a training objective of a comparison between a training output for a training input passage and a groundtruth;
generating, by the trained discord question neural model, a discord question conditioned on the one or more text passages;
determining, by the trained discord question neural model, respective locations within the one or more text passages for inserting the discord question;
receiving, via the communication interface, an indication that the user device is accessing a first text passage from a first data source of the one or more data sources from a client component communicatively coupled to a user device; and
in response to receiving the indication in real time, sending, via the communication interface, the discord question generated prior to receiving the indication, and a first location corresponding to the first text passage to the user device thereby causing the client component to generate and display a reading interface widget by assembling the discord question with the first text passage at the first location.

13. The method of claim 12, wherein the client component includes at least one of:
an application programming interface (API), a cookie, or a web browser extension installed on the user device and communicatively coupled to the one or more processors.

14. The method of claim 12, wherein the reading interface widget has at least one of:
an annotated article interface that displays the first text passage and the discord question inserted between paragraphs in the first text passage,
a recomposed article interface that displays a summary of the one or more text passages and the discord question after the summary, or
a question grid interface that displays the discord question in a row and a respective data source of the first text passage in a column that intersects with the row.

15. The method of claim 14, wherein the first location is immediately under a paragraph containing a first answer to the discord question.

16. The method of claim 15, further comprising
determining, by the trained discord question neural model, a second answer to the discord question based on a second text passage from a second data source of the one or more data sources, the second data source being different from the first data source.

17. The method of claim 16, wherein the communication interface further sends the second answer to the discord question the user device thereby causing the client component to display the second answer and a link to the second data source, at the first location within the first text passage and after the discord question.

18. The method of claim 12, wherein the trained discord question neural model generates the discord question and the first answer to the discord question conditioned on the one or more text passages from the one or more data sources.

19. A non-transitory machine-readable medium comprising a plurality of machine-executable instructions which, when executed by one or more processors, are adapted to cause the one or more processors to perform operations comprising:
receiving, via a communication interface, one or more text passages from one or more data sources, respectively;
training a discord question neural model based on a training objective of a comparison between a training output for a training input passage and a groundtruth;
generating, by the trained discord question neural model, a discord question conditioned on the one or more text passages;
determining, by the trained discord question neural model, respective locations within the one or more text passages for inserting the discord question;
receiving, via the communication interface, an indication that the user device is accessing a first text passage from a first data source of the one or more data sources from a client component communicatively coupled to a user device; and in response to receiving the indication in real time, sending, via the communication interface, the discord question generated prior to receiving the indication, and a first location corresponding to the first text passage to the user device thereby causing the client component to generate and display a reading interface widget by assembling the discord question with the first text passage at the first location.

20. The non-transitory machine-readable medium of claim 19, wherein the client component includes at least one of:

an application programming interface (API), a cookie, or a web browser extension installed on the user device and communicatively coupled to the one or more processors.

* * * * *